United States Patent Office 3,065,229
Patented Nov. 20, 1962

3,065,229
NEW DIOXAZINE DYESTUFFS AND PROCESS
FOR THEIR MANUFACTURE
Karl Ronco, Muttenz, Switzerland, assignor to
Ciba Limited, Basel, Switzerland
No Drawing. Filed June 13, 1960, Ser. No. 35,459
Claims priority, application Switzerland June 23, 1959
7 Claims. (Cl. 260—246)

This invention provides new dioxazine dyestuffs of the general formula (1)
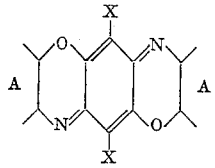

in which each A represents an aryl radical, advantageously a benzene radical, and each X represents an acyloxy or more especially an acylamino group.

The invention also provides a process for the manufacture of the dyestuffs of the above general formula, wherein a quinone of the general formula (2)
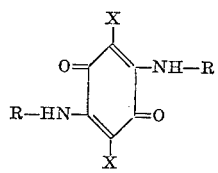

in which each X has the meaning given above, and the symbols R represent different or preferably identical aromatic radicals free from acid groups imparting solubility in water, is treated with a non-sulfonating condensing agent.

The compounds of the Formula 2 used as starting materials are advantageously obtained by condensing one mol of a para-benzoquinone of the formula (3)
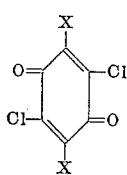

in which each X has the meaning given above, with two mols of an arylamine, advantageously an aminobenzene.

In the compounds of the Formula 2 used as starting materials, X advantageously represents an acylamino group derived from an aliphatic or cycloaliphatic monocarboxylic acid containing at most 8 carbon atoms, for example, an acetylamino, propionylamino or butyrylamino group or an acyloxy group, for example, an acetoxy or propionoxy group. As aromatic radicals there may be mentioned more especially benzene radicals, and preferably those which contain in ortho-position to the imino group an alkoxy group. Furthermore the benzene radical may contain further substituents, for example, halogen atoms, especially chlorine, or alkyl groups, for example, methyl groups or aryl radicals, for example, phenyl groups, or alkoxy groups, for example, methoxy, ethoxy or isopropoxy groups, nitro groups, or acylamino groups, for example, acetylamino, naphthoylamino or benzoylamino groups which latter groups may be substituted in the benzene radical, for example, by halogen atoms or alkyl, alkoxy, nitro, cyano, acylamino, arylamino or phenyl groups. As examples of suitable acylamino radicals there may be mentioned acylamino groups which contain the radicals of the following carboxylic acids:

Benzoic acid,
4-methyl-benzoic acid,
2-fluoro-benzoic acid,
2-chloro-benzoic acid,
4-chloro-benzoic acid,
2:4-dichloro-benzoic acid,
2:5-dichloro-benzoic acid,
4-bromo-benzoic acid,
4-phenyl-benzoic acid,
4-methoxy-benzoic acid,
3-methoxy-benzoic acid,
4-cyano-benzoic acid,
4-nitro-benzoic acid,
1- or 2-naphthoic acid.

The radical R may also represent a polycyclic aromatic radical, for example, a naphthalene, anthracene or pyrene radical. In order to bring about ring closure to form the oxazine ring the aforesaid starting materials are treated with a non-sulfonating condensing agent. As such agents there may be mentioned, for example, sulfuric acid, Friedel-Crafts catalysts, for example, aluminum chloride or iron chloride, and especially aromatic acid chlorides, for example, benzoyl chloride or naphthoyl chloride, benzotrichloride or benzene sulfochloride. The reaction is advantageously carried out in a high boiling inert organic solvent, for example, nitrobenzene, mono-, di- or tri-chlorobenzene, naphthalene or α-chloronaphthalene at a raised temperature.

The dyestuffs of the Formula 1 are valuable red to blue pigments of good fastness to light, which can be used for all purposes for which pigments are customarily used, for example, for so-called pigment printing, that is to say, the printing process in which the pigment is fixed on a substratum, especially on a textile fiber, or on another flat structure such as paper (for example wall paper), or fabrics of glass fibers, by means of a suitable adhesive such as casein, a hardenable synthetic resin, more especially urea-formaldehyde or melamine-formaldehyde condensation products, solutions or emulsions of polyvinyl chloride or polyvinyl acetate or other emulsions, for example, oil-in-water or water-in-oil emulsions. The pigments can also be used for other purposes, for example, in finely dispersed form for dyeing artificial silk from viscose or cellulose ethers or esters, or of polyamides or polyurethanes in the spinning mass, and also for making colored lacquers or lacquer formers, solutions and products of acetyl-cellulose, nitrocellulose, natural resins or synthetic resins, such as polymerization resins, for example, polyvinyl chloride or polystyrene, or condensation resins, for example, aminoplasts, phenoplasts, polyethylene, polyacryl, gums, casein, silicones and silicone resins. They can also be used with advantage for making colored pencils, cosmetic preparations and laminated sheets.

Owing to their chemical inertness and good heat resistance the pigments of this invention can be dispersed by the usual methods in compositions or products of the aforesaid kind and advantageously at a stage at which the compositions or products have not reached their final form. The steps required for shaping, such as spinning, pressing, printing, casting, sticking and the like, can then be carried out in the presence of the pigments.

When the pigments have not previously been brought into a finely dispersed form and/or into the modification especially suitable for use, it is necessary to subject them before us to a conditioning treatment, for example, by grinding them in the dry or aqueous wet state, advantageously in the presence of an organic water-soluble or water-insoluble solvent or by kneading or grinding the crude pigment in the presence of a solid assistant, for example, a salt capable of being removed by washing. A combination of the different methods may also give good results. In many cases it is an advantage, for the purpose of converting it into a finely dispersed form, to grind the crude pigment with the substratum to be colored or with a component of the substratum.

The pigments are distinguished by their very good fastness to migration, which is substantially better than that of dioxazine dyestuffs which contain a hydrogen atom or a halogen atom instead of the substituent X.

The following examples illustrate the invention, the parts and percentages being by weight.

*Example 1*

A mixture of 45 parts of 1-amino-2-methoxy-4-benzoylamino-5-isopropoxybenzene, 18 parts of 2:5-diacetylamino-3:6-dichloroquinone and 10 parts of anhydrous sodium acetate in 500 parts of ethanol is refluxed at the boil for 7 hours, suction-filtered while still hot, and the filter residue is washed with hot ethanol and then with water and dried. The resulting brown powder is the 2:5-diacetylamino - 3:6 - bis - (2'-methoxy-5'-isopropoxy-4'-benzoylamino-phenylamino)-1:4-benzoquinone.

A mixture of 16.4 parts of this product, 6 parts of benzoyl chloride and 300 parts of ortho-dichlorobenzene is heated for 5 hours at 170–175° C. At 100 to 120° C. the pigment is suctioned off, successively washed with hot ortho-dichlorobenzene, hot alcohol and hot water and then dried. The resulting dyestuff of the formula

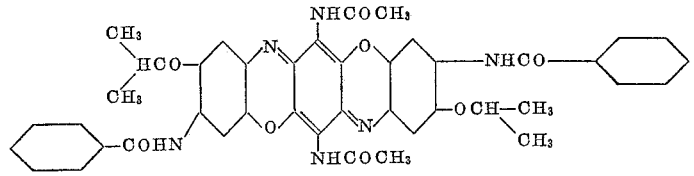

is a powder having a bronzing sheen which, when finely dispersed, colors polyvinyl chloride foils blue tints of good fastness to light and migration.

*Example 2*

A mixture of 6 parts of 2:5-diacetylamino-3:6-dichloroquinone, 12.5 parts of 1-amino-4-benzoylamino-2:5-diethoxybenzene, 3.4 parts of anhydrous sodium acetate and 500 parts of ethanol is refluxed for 15 hours, filtered while still hot, then successively washed with ethanol and water and the residue is dried at 100° C. The reddish brown powder obtained in this manner is the 2:5-diacetylamino-3:6 - di-(2':5'-diethoxy - 4' - benzoylamino-phenylamino)-1:4-benzoquinone.

A mixture of 12.3 parts of this product, 600 parts of ortho-dichlorobenzene and 4.2 parts of benzoyl chloride is heated for 5 hours at 170–175° C. At 100 to 120° C. the pigment is suctioned off, successively washed with hot ortho-dichlorobenzene, hot alcohol and water and then dried. The resulting 2:6-dibenzoylamino-3:7-diethoxy-9:10-diacetylamino-triphene-dioxazine is a greyish blue powder which in the finely dispersed state colors polyvinyl chloride foils strong bluish violet tints of very good fastness to migration and light.

*Examples 3 to 5*

The following table lists further products of similar properties, obtained as described above. The base used instead of 1-amino-4-benzoylamino-2:5-diethoxybenzene is shown in column I, while column II gives the tint of polyvinyl chloride foils colored with the dioxazine pigment.

|   | I | II |
|---|---|---|
| 3 | 1-amino-4-acetylamino-2:5-diethoxybenzene | violet. |
| 4 | 1-amino-4-formylamino-2:5-diethoxybenzene | Do. |
| 5 | 1-amino-2-methoxynaphthalene | Do. |

*Example 6*

A mixture of 9 parts of 2:5-diacetylamino-3:6-dichloroquinone, 19.2 parts of 1-amino-4-benzoylamino-2:5-dimethoxybenzene, 5.1 parts of anhydrous sodium acetate and 500 parts of ethanol is refluxed for 10 hours, then filtered while still hot, then washed with ethanol and then with water and the residue is dried at 100° C., to yield 2:5-diacetylamino-3:6-di-(2':5'-dimethoxy-4'-benzoylamino-phenylamino)-1:4-benzoquinone as a reddish brown powder.

A mixture of 11.4 parts of this product, 4.2 parts of benzoyl chloride and 500 parts of ortho-dichlorobenzene is heated for 5 hours at 170 to 175° C., filtered, and successively washed with hot ortho-dichlorobenzene, hot alcohol and water, to yield 2:6-dibenzoylamino-3:7-dimethoxy - 9:10 - diacetylamino-triphene-dioxazine of the formula

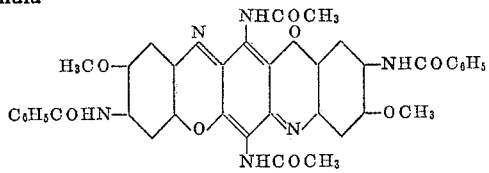

as a reddish violet powder. In the form of a fine dispersion it colors polyvinyl chloride foils red-violet tints of very good fastness to migration and light.

*Examples 7 to 9*

The following table lists further products having similar properties, obtained as described above. In column I is shown the base used instead of 1-amino-4-benzoylamino-2:5-dimethoxybenzene, while column II gives the tint of polyvinyl chloride foils colored with the dioxazine pigment.

|   | I | II |
|---|---|---|
| 7 | 1-amino-4-(4'-chloro)-benzoylamino-2:5-dimethoxybenzene. | violet. |
| 8 | 1-amino-4-(4'-methyl)-benzoylamino-2:5-dimethoxybenzene. | blue violet. |
| 9 | 1-amino-4-acetylamino-2:5-dimethoxybenzene. | red violet. |

*Example 10*

A mixture of 11.5 parts of 1-amino-2-methoxy-4-benzoylamino-5-methylbenzene, 6 parts of 2:5-diacetylamino-3:6-dichloroquinone, 3.5 parts of anhydrous sodium acetate and 500 parts of ethanol is refluxed at the boil for 5 hours, then filtered while still hot and washed with hot alcohol and water. After drying, a reddish brown powder is obtained which is 2:5-diacetylamino-3:6-bis-(2'-methoxy - 5' - methyl-4'-benzoylamino-phenylamino)-1:4-benzoquinone.

7.3 parts of this product are heated in 200 parts of ortho-dichlorobenzene in the presence of 3 parts of benzoyl chloride for 5 hours at 170 to 175° C., suction-filtered, and then washed with hot ortho-dichlorobenzene, hot alcohol and water, to yield 2:6-dibenzoylamino-3:7-dimethyl - 9:10 - diacetylamino - triphene-dioxazine of the formula

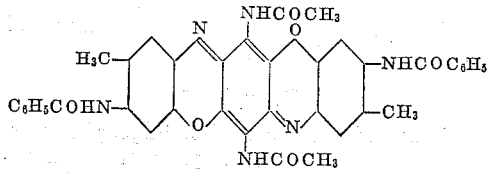

in the form of a red powder which in a fine dispersion colors polyvinyl chloride foils a red tint of good fastness to light and migration.

Example 11

A mixture of 11 parts of 1-amino-2-methoxy-4-benzoylamino-5-chlorobenzene, 5.8 parts of 2:5-diacetylamino-3:6-dichloroquinone, 3.5 parts of anhydrous sodium acetate and 300 parts of ethanol is refluxed for 5 hours, filtered while still hot, then washed successively with ethanol and water, and dried. The resulting brown powder is 2:5-diacetylamino-3:6-bis-(2'-methoxy-4'-benzoylamino-5'-chlorophenylamino)-1:4-benzoquinone.

3.3 parts of this product are heated in 150 parts of ortho-dichlorobenzene in the presence of 0.8 part of benzoyl chloride for 4 hours at 170–175° C., suction filtered, then washed with hot ortho-dichlorobenzene, hot alcohol and water, and yield 2:6-dibenzoylamino-3:7-dichloro - 9:10 - diacetylamino-triphene-dioxazine of the formula

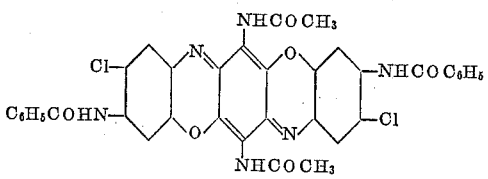

in the form of a reddish brown powder which in finely dispersed form colors polyvinyl chloride foils a strong red tint of good fastness to light and migration.

Example 12

A mixture of 18 parts of 1-amino-2-methoxy-5-chlorobenzene, 14.5 parts of 2:5-diacetylamino-3:6-dichloroquinone, 30 parts of crystalline sodium acetate and 200 parts of ethanol of 96% strength is refluxed at the boil for 5 hours, suction-filtered while still hot, then washed with alcohol and water and dried to yield 2:5-diacetylamino - 3:6 - bis-(2'-methoxy-5'-chlorophenylamino)-1:4-benzoquinone in the form of a pale-brown powder.

10.7 parts of this product are heated in 200 parts of ortho-dichlorobenzene in the presence of 6 parts of benzoyl chloride for 5 hours at 170–175° C., suction-filtered, then washed with hot dichlorobenzene, hot alcohol and water and yield 3:7 - dichloro - 9:10-diacetylamino-triphene-dioxazine of the formula

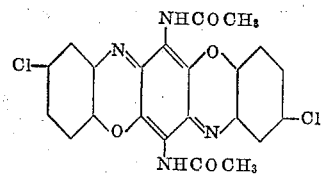

as a red powder which in fine dispersion colors polyvinyl chloride foils scarlet tints of good fastness to light.

Example 13

A mixture of 8 parts of 1-amino-2:4-dimethoxy-5-chlorobenzene, 5.8 parts of 2:5-diacetylamino-3:6-dichloroquinone, 6 parts of crystalline sodium acetate and 200 parts of ethanol of 96% strength is refluxed for 15 hours. The solid reaction product is filtered off while still hot, washed with ethanol and water and dried in a vacuum cabinet at 70° C., to yield 2:5-diacetylamino-3:6-bis-(2':4'-dimethoxy-5'-chlorophenylamino)-1:4-benzoquinone in the form of a brown powder.

A mixture of 5.9 parts of this product, 100 parts of ortho-dichlorobenzene and 2.6 parts of benzoyl chloride is heated for 4 hours at 170–175° C. The precipitated pigment is filtered off at 100° C., purified by being washed with hot ortho-dichlorobenzene, alcohol and water, and then dried. The dark, red pigment is the 2:6-dimethoxy-3:7-dichloro-9:10-diacetylamino-triphene-dioxazine of the formula

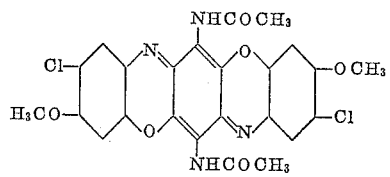

which in finely dispersed form colors polyvinyl chloride foils violet tints of good fastness to migration and light.

Example 14

A mixture of 6.4 parts of 2:5-dipropionylamino-3:6-dichlorobenzoquinone-(1:4), 12.6 parts of 1-amino-4-benzoylamino-2:5-diethoxybenzene, 4 parts of anhydrous sodium acetate and 100 parts of ethanol is refluxed for 10 hours, filtered while still hot, washed with ethanol and then with water, and the residue is dried at 100° C., to yield 2:5-dipropionylamino-3:6-di-(2':5'-diethoxy-4'-benzoylamino-phenylamino)-1:4 - benzoquinone as a pale-brown powder.

4.24 parts of this product are heated in 100 parts of ortho-dichlorobenzene with 1.2 parts of benzoyl chloride for 5 hours at 170 to 175° C. The pigment is filtered off at 100° C., successively washed with ortho-dichlorobenzene, alcohol and water and dried. The resulting 2:6-dibenzoylamino - 3:7 - diethoxy-9:10-dipropionylamino-triphene-dioxazine forms a green powder which in the form of a fine dispersion colors polyvinyl chloride foils a bluish violet tint of very good fastness to migration and light.

Examples 15 and 16

In the following table further products are listed which have been prepared as described in Example 14. The base used instead of 1-amino-4-benzoylamino-2:5-diethoxybenzene is shown in column I, while column II gives the tint of polyvinyl chloride foils colored with the dioxazine pigment.

| | I | II |
|---|---|---|
| 15 | 1-amino-4-benzoylamino-2:5-dimethoxybenzene. | reddish blue |
| 16 | 1-amino-2-methoxy-4-benzoylamino-5-chlorobenzene. | claret. |

Example 17

A mixture of 3.5 parts of 2:5-dibutyrylamino-3:6-dichlorobenzoquinone-(1:4), 6 parts of 1-amino-4-benzoylamino-2:5-diethoxybenzene, 2 parts of anhydrous sodium acetate and 100 parts of ethanol is refluxed for 6 hours, filtered while still hot, washed with ethanol and hot water; the residue is dried at 100° C., to yield 2:5-dibutyrylamino-3:6-di - (2':5' - diethoxy-4' - benzoylaminophenylamino)-1:4-benzoquinone as a blue powder.

A mixture of 4.4 parts of this product, 1.2 parts of benzoyl chloride and 100 parts of ortho-dichlorobenzene is heated for 5 hours at 170–175° C., filtered and washed with hot ortho-dichlorobenzene, alcohol and water, to yield 2:6-dibenzoylamino-3:7-diethoxy-9:10-dibutyrylamino-triphene-dioxazine as a reddish brown powder. A fine dispersion thereof colors polyvinyl chloride foils blue-violet tints of very good fastness to migration and light.

Examples 18 and 19

In the following table are shown further products having similar properties, obtained as described in Example 17. The base used instead of 1-amino-4-benzoylamino-2:5-diethoxybenzene is shown in column I, while column II gives the tint of polyvinyl chloride foils colored with the dioxazine pigment.

|    | I | II |
|----|---|-----|
| 18 | 1-amino-4-benzoylamino-2:5-dimethoxybenzene. | red violet. |
| 19 | 1-amino-2-methoxy-4-benzoylamino-5-chlorobenzene. | claret. |

Example 20

A mixture of 6 parts of 1-amino-2-methoxy-4-benzoylamino-5-chlorobenzene, 2.15 parts of 2:5-dihexahydrobenzoylamino-3:6-dichlorobenzoquinone-(1:4) and 0.8 part of anhydrous sodium acetate in 30 parts of dioxane is refluxed for 6 hours, filtered while still hot, washed with dioxane and then with water and dried. The resulting brown powder is 2:5-dihexahydrobenzoylamino-3:6-bis-(2'-methoxy-4'-benzoylamino-5'-chlorophenylamino)-1:4-benzoquinone.

0.9 part of this product is heated in 20 parts of ortho-dichlorobenzene in the presence of 0.3 part of benzoyl chloride for 4 hours at 170 to 175° C., filtered, then washed with hot ortho-dichlorobenzene, alcohol and water, to yield 2:6-dibenzoylamino-3:7-dichloro-9:10-dihexahydrobenzoylamino-triphene-dioxazine as a red powder which in a fine dispersion colors polyvinyl chloride foils a strong red tint of very good fastness to light and migration.

Example 21

A mixture of 5.8 parts of 2:5-diacetoxy-3:6-dichlorobenzoquinone-(1:4), 13 parts of 1-amino-4-benzoylamino-2:5-diethoxybenzene, 3.5 parts of anhydrous sodium acetate and 50 parts of dioxane is refluxed for 6 hours, then filtered while still hot, and washed with dioxane and then with water. The residue is dried at 80° C., to yield 2:5 diacetoxy-3:6-di-(2':5'-diethoxy-4'-benzoylamino-phenylamino)-1:4-benzoquinone as a grey powder.

4.1 parts of this product and 1.2 parts of benzoyl chloride in 80 parts of ortho-dichlorobenzene are heated for 4 hours at 170 to 175° C. At about 100° C. the pigment is filtered off, washed with hot ortho-dichlorobenzene, alcohol and water and dried, to yield the 2:6-dibenzoylamino-3:7-diethoxy-9:10-diacetoxy-triphene-dioxazine of the formula

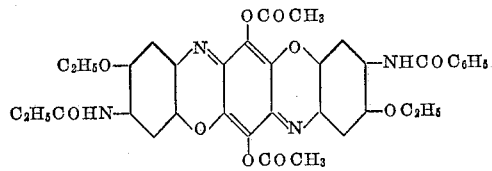

as a reddish brown powder which in a fine dispersion colors polyvinyl chloride foils strong blue tints of good fastness to migration and light.

When the condensation is performed with 1-amino-4-benzoylamino-2:5-dimethoxybenzene instead of with 1-amino-4-benzoylamino-2:5-diethoxybenzene, a pigment is obtained which gives a red-violet coloration when incorporated in polyvinyl chloride.

Example 22

A mixture of 6.4 parts of 2:5-dipropionoxy-3:6-dichlorobenzoquinone-(1:4), 12 parts of 1-amino-4-benzoylamino-2:5-dimethoxybenzene, 3.5 parts of anhydrous sodium acetate and 100 parts of ethanol is refluxed for 10 hours, then filtered while still hot, washed with ethanol, then with water; the residue is dried at 80° C., to yield 2:5 - dipropionoxy - 3:6 - di - (2':5' - dimethoxy - 4'-benzoylamino-phenylamino)-1:4-benzoquinone as a dark grey powder.

7.9 parts of this product and 2.4 parts of benzoyl chloride in 150 parts of ortho-dichlorobenzene are heated for 5 hours at 170 to 175° C., filtered and then washed with hot ortho-dichlorobenzene, alcohol and water, to yield 2:6 - dibenzoylamino - 3:7 - dimethoxy - 9:10 - dipropionoxy-triphene-dioxazine as a brown powder which in a fine dispersion colors polyvinyl chloride foils red-violet tints.

Example 23

65 parts of polyvinyl chloride, 35 parts of dioctylphthalate and 0.2 part of the finely dispersed dyestuff prepared as described in the second paragraph of Example 1 are stirred together and then rolled to and fro on a two-roller calender for 7 minutes at 140° C., whereby a blue foil is obtained which has good fastness to light and migration.

What is claimed is:

1. A dioxazine pigment of the formula

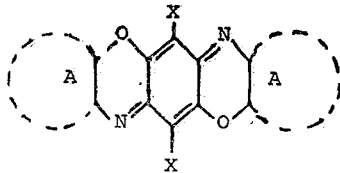

in which X represents a member selected from the group consisting of an acylamino and an acyloxy group derived from a member selected from the group consisting of lower aliphatic carboxylic and hexahydrobenzoic acids and A represents a member selected from the group consisting of phenyl and naphthyl.

2. A dioxazine pigment of the formula

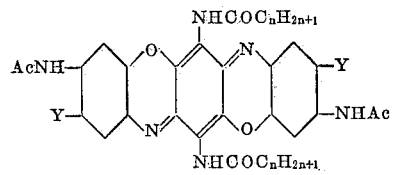

in which n is a whole number of at most 5, Ac an acyl radical selected from the group consisting of formyl, lower alkylcarbonyl and benzoyl and Y a member selected from the group consisting of hydrogen and chlorine atoms, lower alkyl and alkoxy groups.

3. The dyestuff of the formula

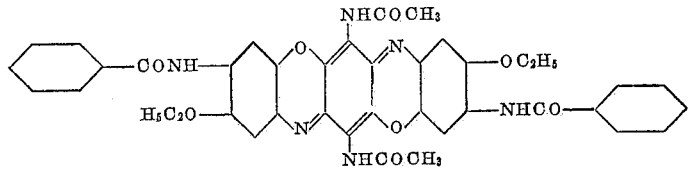

4. The dyestuff of the formula
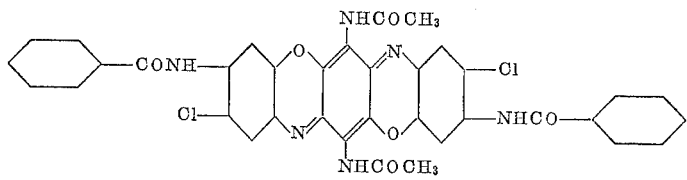
5. The dyestuff of the formula
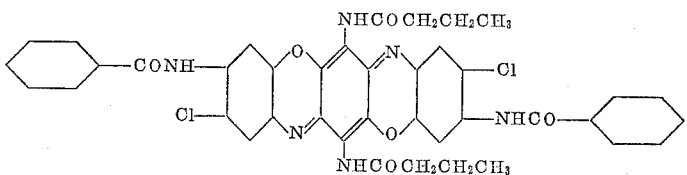
6. The dyestuff of the formula
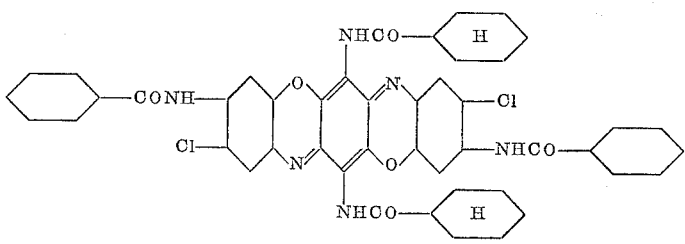
7. The dyestuff of the formula
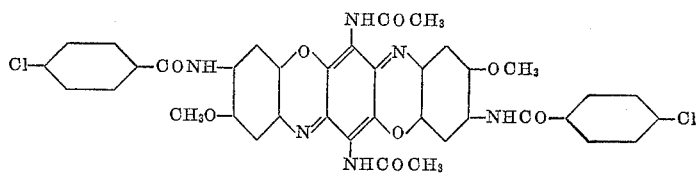
References Cited in the file of this patent
UNITED STATES PATENTS
| | | |
|---|---|---|
| 1,065,063 | Maag et al. | June 17, 1913 |
| 2,086,871 | Kranzlein et al. | July 13, 1937 |
| 2,948,721 | Frey | Aug. 9, 1960 |
FOREIGN PATENTS
| | | |
|---|---|---|
| 567,538 | Belgium | Nov. 10, 1958 |

UNITED STATES PATENT OFFICE
CERTIFICATE OF CORRECTION

Patent No. 3,065,229            November 20, 1962

Karl Ronco

It is hereby certified that error appears in the above numbered patent requiring correction and that the said Letters Patent should read as corrected below.

Column 2, line 70, for "us" read -- use --; column 4, lines 24 to 31, and column 5, lines 3 to 9, the center portion of the formulas should appear as shown below instead of as in the patent:

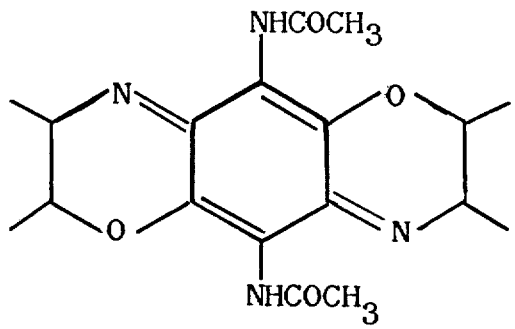

Signed and sealed this 29th day of October 1963.

(SEAL)
Attest:
ERNEST W. SWIDER            EDWIN L. REYNOLDS
Attesting Officer            Acting Commissioner of Patents